(12) United States Patent
Kim et al.

(10) Patent No.: US 9,819,407 B2
(45) Date of Patent: Nov. 14, 2017

(54) PRE-COMPENSATION OF THE PHASE SHIFTING ERROR

(71) Applicant: LG ELECTRONICS INC., Seoul (KR)

(72) Inventors: Kitae Kim, Seoul (KR); Jaehoon Chung, Seoul (KR); Jiwon Kang, Seoul (KR); Kwangseok Noh, Seoul (KR); Kukheon Choi, Seoul (KR); Hyunsoo Ko, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/034,020

(22) PCT Filed: Apr. 30, 2014

(86) PCT No.: PCT/KR2014/003856
§ 371 (c)(1),
(2) Date: May 3, 2016

(87) PCT Pub. No.: WO2015/064868
PCT Pub. Date: May 7, 2015

(65) Prior Publication Data
US 2016/0269090 A1  Sep. 15, 2016

Related U.S. Application Data

(60) Provisional application No. 61/899,310, filed on Nov. 4, 2013.

(51) Int. Cl.
*H04L 1/02* (2006.01)
*H04B 7/06* (2006.01)
(Continued)

(52) U.S. Cl.
CPC .......... *H04B 7/0656* (2013.01); *H04B 7/046* (2013.01); *H04B 7/0617* (2013.01); *H04B 7/0619* (2013.01); *H04B 17/11* (2015.01); *H04L 25/0224* (2013.01); *H04L 25/49* (2013.01); *H04L 27/2634* (2013.01); *H04L 27/2657* (2013.01); *H04L 25/03343* (2013.01)

(58) Field of Classification Search
CPC .. H04B 7/0639; H04B 7/0417; H04B 7/0654; H04B 7/0456; H04B 7/0626;
(Continued)

(56) References Cited

U.S. PATENT DOCUMENTS 4,656,434 A * 4/1987 Selin ................. H03F 3/602
                                                330/124 R
6,326,841 B1 * 12/2001 Laureanti ............ H03F 1/0294
                                                330/53
(Continued)

FOREIGN PATENT DOCUMENTS

KR    1020090030200    3/2009

OTHER PUBLICATIONS

PCT International Application No. PCT/KR2014/003856, Written Opinion of the International Searching Authority dated Aug. 27, 2014, 10 pages.

*Primary Examiner* — Khanh C Tran
(74) *Attorney, Agent, or Firm* — Lee Hong Degerman Kang Waimey

(57) ABSTRACT

In this disclosure, methods for pre-compensation of the phase shifting error, and apparatuses for the same are disclosed. In one example, a device performs precoding of a digital signal, while acquiring information on an error caused by a phase shifting of the precoding. Then, the device performs phase compensation on the digital signal based on the acquired information. This phase compensated-digital signal is converted to an analog signal, and is transmitted to a receiver.

8 Claims, 15 Drawing Sheets

(51) Int. Cl.
    *H04L 25/02*     (2006.01)
    *H04B 7/04*     (2017.01)
    *H04B 17/11*     (2015.01)
    *H04L 27/26*     (2006.01)
    *H04L 25/49*     (2006.01)
    *H04L 25/03*     (2006.01)

(58) Field of Classification Search
    CPC ........ H04B 7/0632; H04L 2025/03426; H04L 25/03343
    See application file for complete search history.

(56) References Cited

U.S. PATENT DOCUMENTS

| | | | | |
|---|---|---|---|---|
| 6,618,352 | B1* | 9/2003 | Shirakata | H04L 27/2657 370/203 |
| 2007/0286307 | A1* | 12/2007 | Hayashi | H03F 1/3247 375/297 |
| 2008/0063120 | A1* | 3/2008 | Aoki | H04L 27/2613 375/344 |
| 2008/0192811 | A1* | 8/2008 | Son | H04B 7/0641 375/219 |
| 2008/0260058 | A1* | 10/2008 | Li | H04B 7/0634 375/260 |
| 2010/0061482 | A1 | 3/2010 | Lee et al. | |
| 2010/0208779 | A1* | 8/2010 | Park | H04B 7/0671 375/219 |
| 2012/0033759 | A1 | 2/2012 | Goransson et al. | |
| 2013/0034182 | A1 | 2/2013 | Lee et al. | |
| 2013/0039401 | A1 | 2/2013 | Han et al. | |
| 2013/0064277 | A1 | 3/2013 | Liao et al. | |
| 2013/0301454 | A1* | 11/2013 | Seol | H04B 7/043 370/252 |
| 2014/0307654 | A1* | 10/2014 | Kim | H04B 7/0617 370/329 |
| 2016/0080051 | A1* | 3/2016 | Sajadieh | H04B 7/0456 375/267 |

* cited by examiner

E-UMTS (a) Existing antenna system  (b) Active antenna system

N Elements

N Elements

FIG. 10
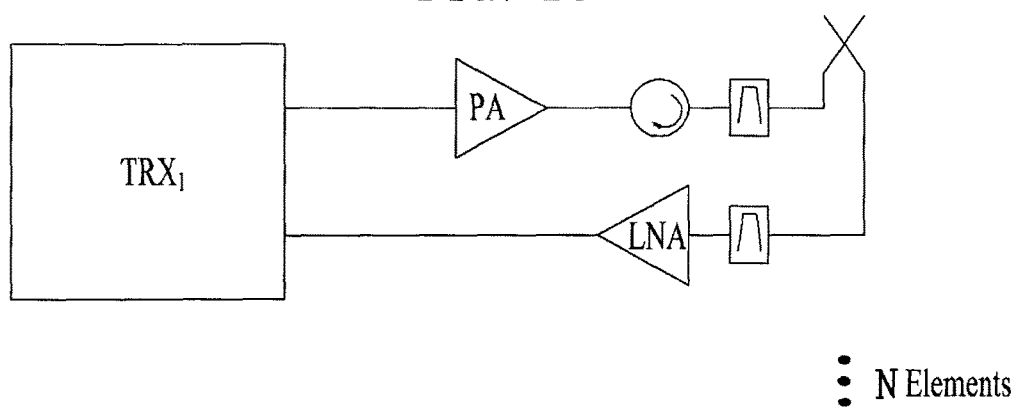
⋮ N Elements
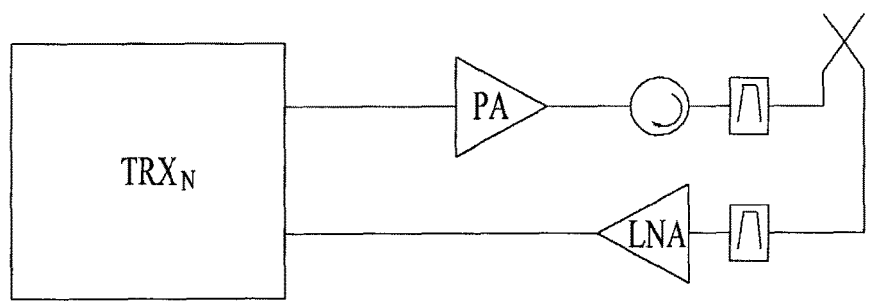

PRE-COMPENSATION OF THE PHASE SHIFTING ERROR

CROSS-REFERENCE TO RELATED APPLICATIONS

This application is the National Stage filing under 35 U.S.C. 371 of International Application No. PCT/KR2014/003856, filed on Apr. 30, 2014, which claims the benefit of U.S. Provisional Application No. 61/899,310, filed on Nov. 4, 2013, the contents of which are all hereby incorporated by reference herein in their entirety.

TECHNICAL FIELD

The present invention relates to a wireless communication system, and more particularly, to methods for pre-compensation of the phase shifting error, and apparatuses for the same.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Reducing interference, decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for pre-compensation of the phase shifting error, and apparatuses for the same that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, methods and apparatuses are provided.

In one aspect, a method for transmitting signals in a mobile communication system using multiple antennas, the method comprising: precoding a digital signal; acquiring information on an error caused by a phase shifting of the precoding; performing a phase compensation on the digital signal based on the acquired information; converting the phase compensated-digital signal to an analogue signal; and transmitting the analogue signal to a receiver, is provided.

The information on the error caused by the phase shifting may comprise amount of error per subcarrier set.

The phase compensation may compensate different amount of phase for each subcarrier set.

The information may be acquired based on feedback information from the receiver.

Preferably, converting the phase compensated-digital signal to the analogue signal may comprise performing an IFFT to the phase compensated-digital signal.

In another aspect of the present invention, a device operating in a wireless communication system, the device comprising: a transceiver for transmitting and receiving signals to and from another device; and a processor connected to the transceiver and configured to a digital signal to be transmitted, wherein the processor acquires information on an error caused by a phase shifting of the precoding, performs a phase compensation on the digital signal based on the acquired information, converts the phase compensated-digital signal to an analogue signal, and controls the transceiver to transmit the analogue signal to the another device, is provided.

The information on the error caused by the phase shifting may comprise amount of error per subcarrier set.

The processor may compensate different amount of phase for each subcarrier set as the phase compensation.

The processor may acquire the information based on feedback information from the another device.

The processor may perform an IFFT to the phase compensated-digital signal for converting the phase compensated-digital signal to the analogue signal.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 8-10 show various antenna array types for the present invention.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

Figure 1:
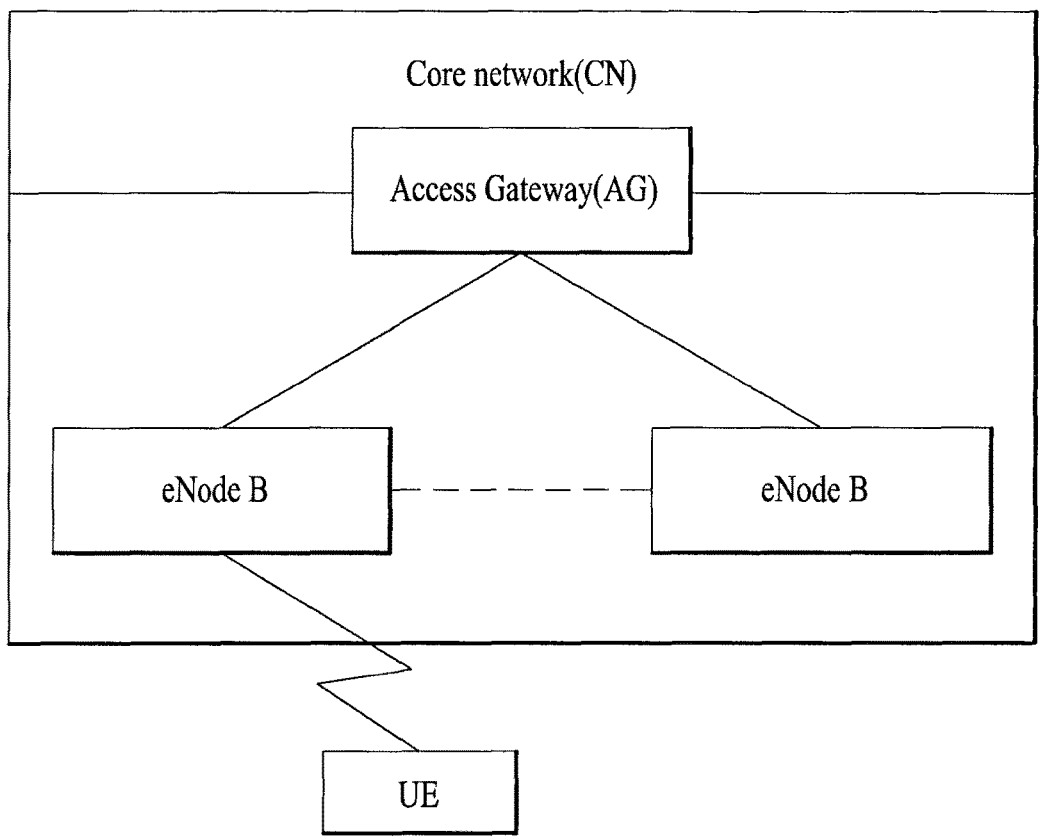
FIG. 1 is a diagram showing a network structure of an Evolved Universal Mobile Telecommunications System (E-UMTS) as an example of a wireless communication system.
Figure 2:
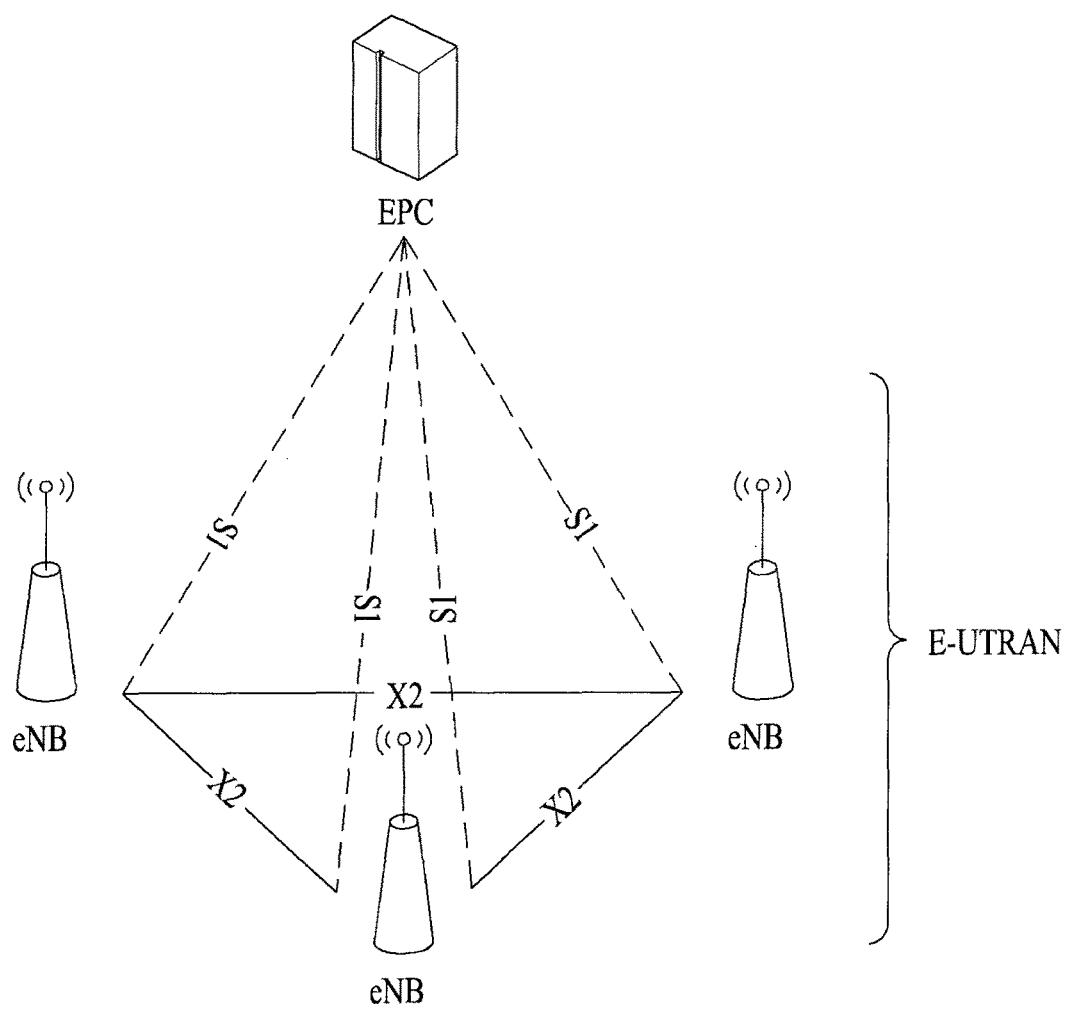
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
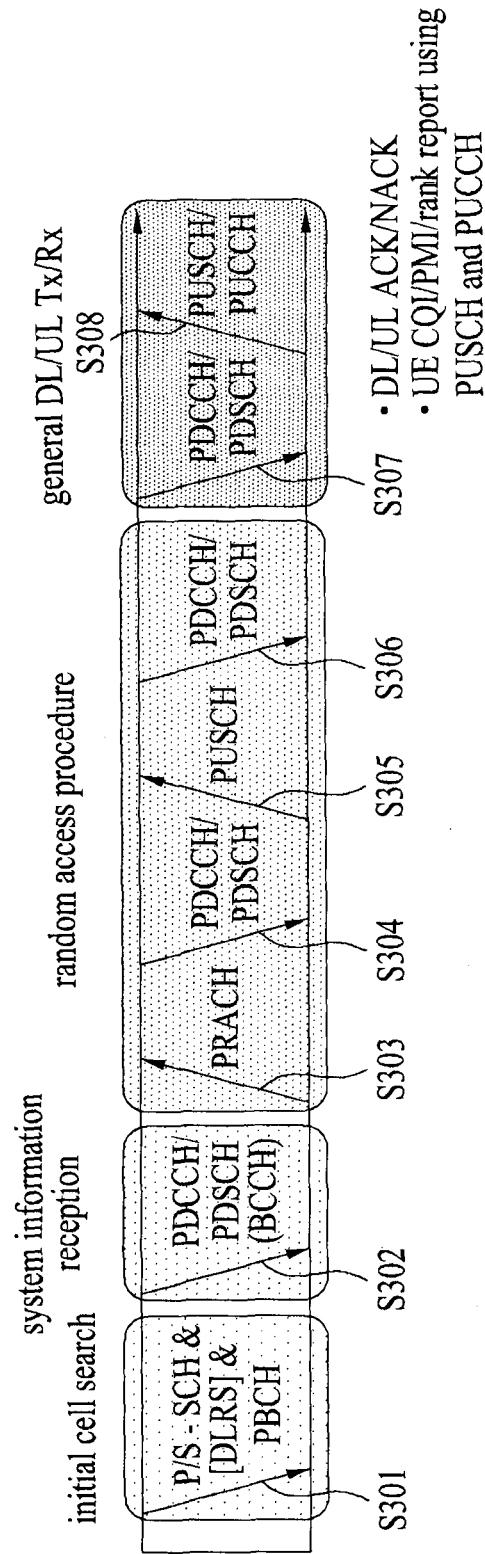
FIG. 3 is a diagram showing physical channels used in a 3GPP system and a general signal transmission method using the same.

FIG. 3 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

In one embodiment of the present invention to which the above-described system is applicable, a compensation method considering characteristics of a phase shifter upon analog beamforming at a transmitter including a two-dimensional (2D) antenna array including a plurality of antennas is provided. A phase shifter shifts the phase of an analog RF signal passing through a digital-to-analog converter (DAC) and may shift the phase in a desired direction in a relatively narrow frequency band. However, in consecutive wideband transmission of several hundreds of MHz or more, the phase shifting values of both ends of the frequency band may be different from that of the center of the frequency band. Since it is impossible to divide a signal, which has already been converted into an RF analog signal, per band and to enable the divided signal to pass through the phase shifter, in the present embodiment, a process of pre-compensating for a phase shifting difference per band in a digital signal processing block before passing through a DAC of a transmitter is proposed.

In the detailed embodiment, a method of estimating a phase difference value generated per band when phase shifting is performed by a phase shifter, at a transmitter for performing wideband analog beamforming, and pre-compensating for the phase difference in a digital signal processing procedure is proposed. In addition, in another aspect of the present invention, a method of estimating a phase difference of a phase shifter and an antenna structure capable of pre-compensating for the phase difference are proposed.

For this purpose, first, active antenna system and 3D beamforming scheme are explained.

Figure 4:
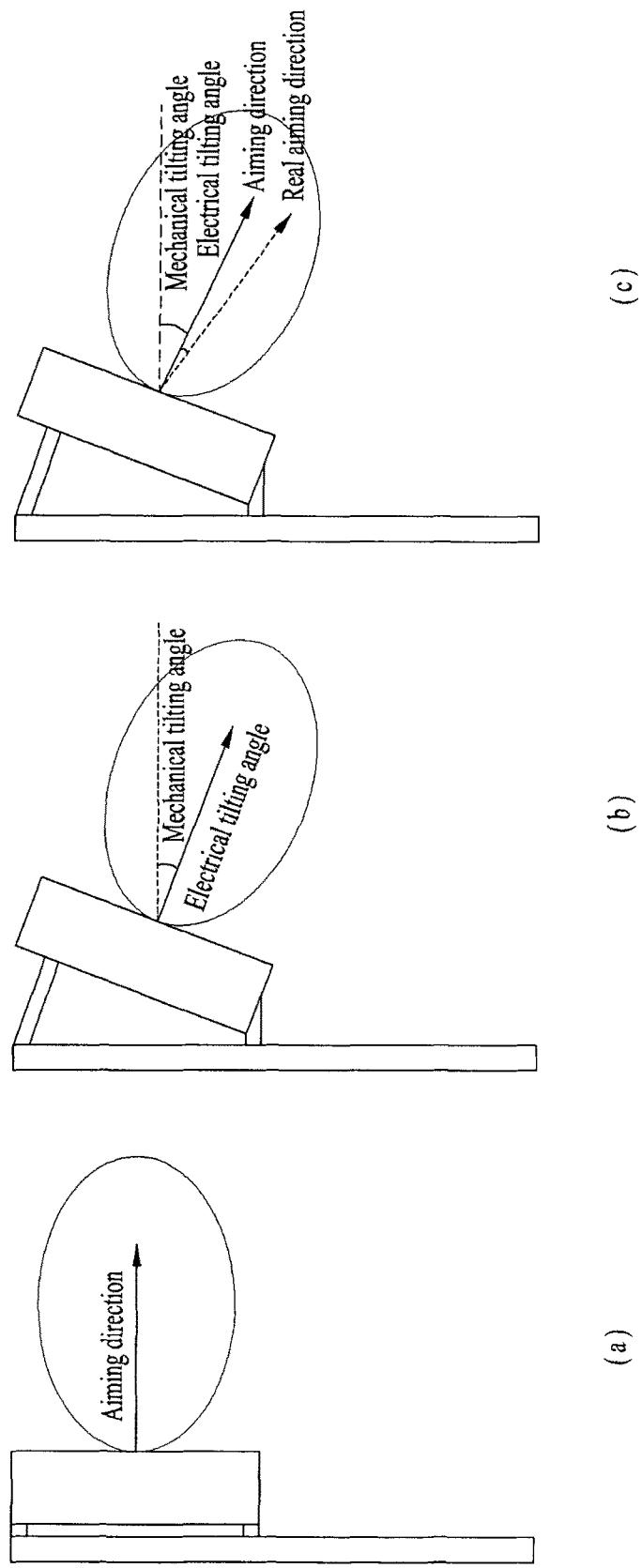
FIG. 4 is a diagram to describe an antenna tilting system.

FIG. 4 is a diagram to describe an antenna tilting system.

Particularly, FIG. 4 (a) shows an antenna structure to which an antenna tilting is not applied. FIG. 4 (b) shows an antenna structure to which a mechanical tilting is applied. And, FIG. 4 (c) shows an antenna structure to which both a mechanical tilting and an electrical tilting are applied.

Comparing FIG. 4 (a) and FIG. 4 (b) to each other, regarding a mechanical tilting, as shown in FIG. 4 (b), it is disadvantageous in that a beam direction is fixed in case of an initial installation. Moreover, regarding an electrical tilting, as shown in FIG. 4 (c), despite that a tilting angle is changeable using an internal phase shift module, it is disadvantageous in that a very restrictive vertical beamforming is available only due to a substantially cell-fixed tilting.

Figure 5:
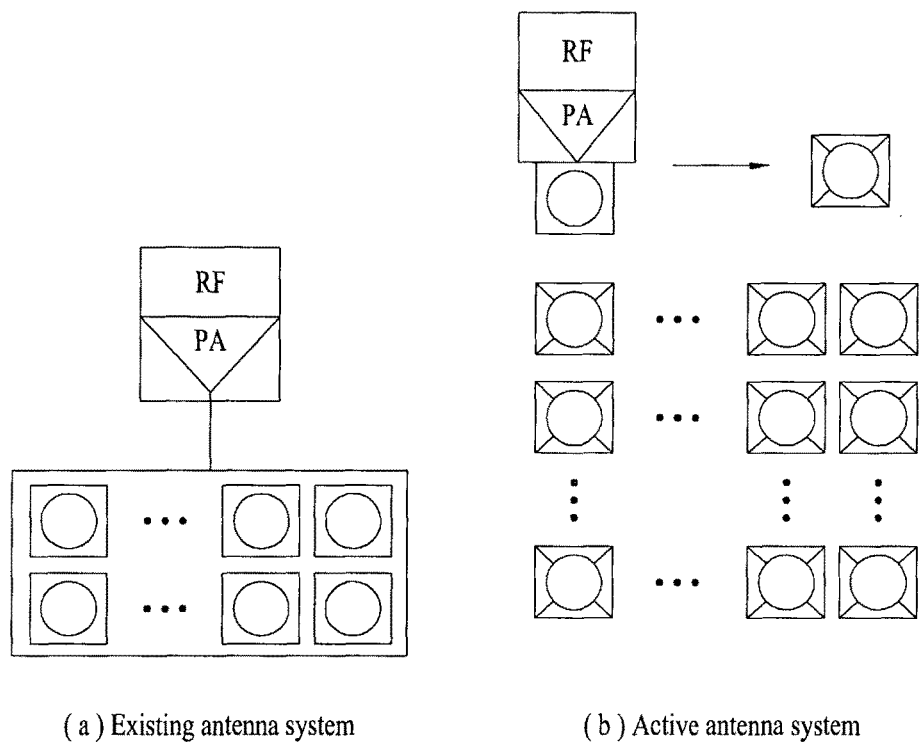
FIG. 5 is a diagram for one example of comparing an existing antenna system and an active antenna system to each other.

FIG. 5 is a diagram for one example of comparing an existing antenna system and an active antenna system to each other.

Particularly, FIG. 5 (a) shows an existing antenna system, while FIG. 5 (b) shows an active antenna system.

Referring to FIG. 5, in an active antenna system, unlike an existing antenna system, each of a plurality of antenna modules includes active devices such as a power amplifier, an RF module and the like. Hence, the active antenna system is capable of controlling/adjusting a power and phase for each of the antenna modules.

In a generally considered MIMO antenna structure, a linear antenna (i.e., 1-dimensional array antenna) like a ULA (uniform linear array) antenna is taken into consideration. In this 1-dimensional array structure, a beam generable by beamforming exists in a 2-dimensional plane. This applies to a PAS (passive antenna system) based MIMO structure of an existing base station. Although vertical antennas and horizontal antennas exist in the PAS based base station, since the vertical antennas are combined into one RF module, beamforming in vertical direction is impossible but the abovementioned mechanical tilting is applicable only.

Yet, as an antenna structure of a base station evolves into AAS, an independent RF module is implemented for each antenna in a vertical direction, whereby a beamforming in a vertical direction is possible as well as in a horizontal direction. Such a beamforming is called an elevation beamforming.

According to the elevation beamforming, generable beams can be represented in a 3-dimensional space in vertical and horizontal directions: Hence, such a beamforming can be named a 3-dimensional (3D) beamforming. In particular, the 3D beamforming is possible because the 1D array antenna structure is evolved into a 2D array antenna structure in a plane shape. In this case, the 3D beamforming is possible in a 3D array structure of a ring shape as well as in a planar-shaped antenna array structure. The 3D beamforming is characterized in that an MIMO process is performed in a 3D space owing to antenna deployments of various types instead of an existing 1D array antenna structure.

Figure 6:
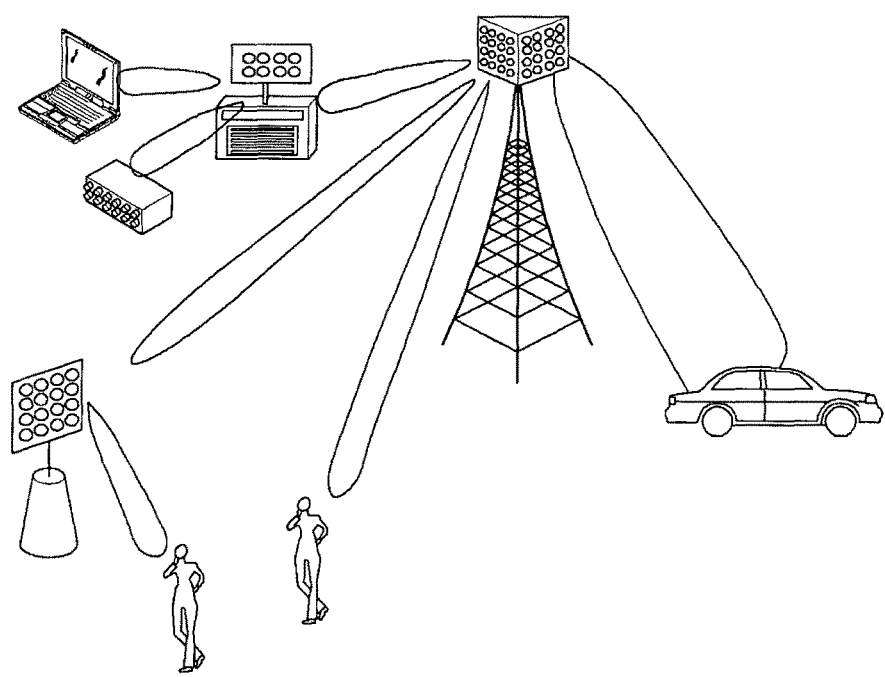
FIG. 6 is a diagram for one example of forming a UE-specific beam based on an active antenna system.

FIG. 6 is a diagram for one example of forming a UE-specific beam based on an active antenna system.

Referring to FIG. 6, owing to the 3D beamforming, a beamforming is possible in case that a user equipment moves back and forth as well as in case that the user equipment moves right and left to the base station. Hence, it can be observed that a higher degree of freedom is provided to a UE-specific beamforming.

Moreover, as a transmission environment using an active antenna based 2D array antenna structure, an environment (O2I: outdoor to indoor) of a transmission from an outdoor base station to an indoor user equipment, an environment (indoor hotspot) of a transmission from an indoor base station to an indoor user equipment or the like can be considered as well as an environment of a transmission from an outdoor base station to an outdoor user equipment.

Figure 7:
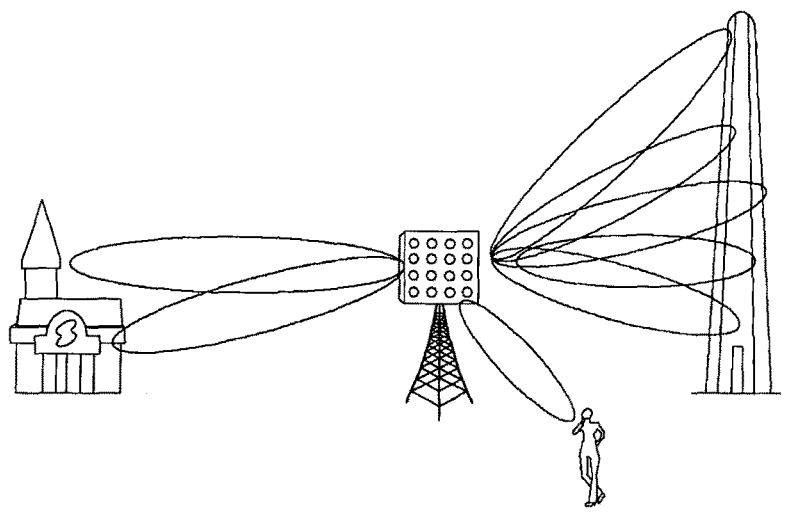
FIG. 7 is a diagram of a 2-dimensional (2D) beam transmission scenario based on an active antenna system.

FIG. 7 is a diagram of a 2-dimensional (2D) beam transmission scenario based on an active antenna system.

Referring to FIG. 7, assuming a real cell environment in which a plurality of various buildings exist within a cell, a base station needs to consider a vertical beam steering capability in consideration of various user equipment heights in accordance with a building height as well as a UE-specific horizontal beam steering capability: Considering such a cell environment, it is necessary to reflect channel characteristics (e.g., radio shadow/path loss variation due to a height difference, fading characteristic change, etc.) considerably different from an existing radio channel environment.

So to speak, a 3D beamforming, which is evolved from a horizontal beamforming performed in a horizontal direction only based on an antenna structure of an existing linear 1D array, indicates an MIMO processing scheme performed in a manner of being extended to and combined with an elevation beamforming or a vertical beamforming based on an antenna structure of multi-dimensional arrays including a planar array and the like.

In addition to or instead of the above mentioned Adaptive antenna system and 3D beam forming scheme, various antenna array types can be used.

Figure 8:
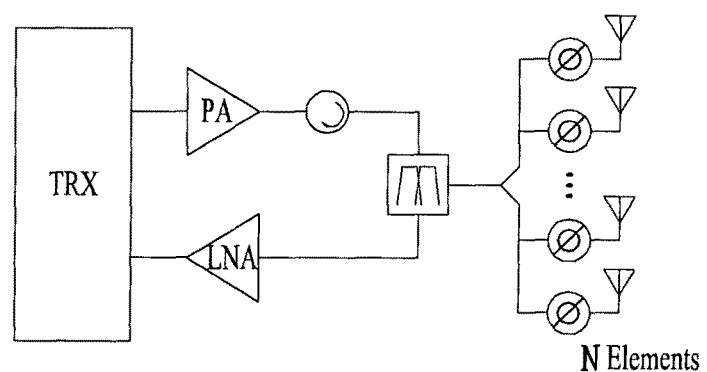
Figure 9:
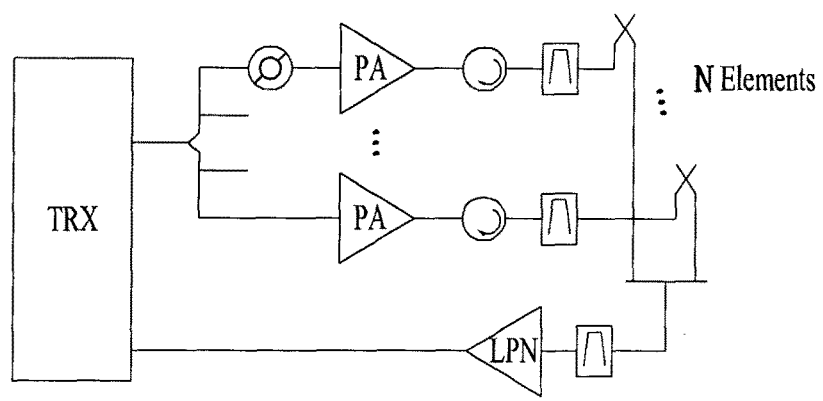

FIGS. 8-10 show various antenna array types for the present invention. Specifically, FIG. 8 shows a concept of passive antenna array (Common TRX+Common PA+Multiple N antenna). FIG. 9 shows a concept of active antenna array (Common TRX+Multiple PA+Multiple N antenna). FIG. 10 shows a concept of multiple Active antenna array (Multiple TRX+Multiple PA+Multiple N antenna).

Unlike a general antenna transmitter/receiver configuration, in an active array antenna, a power amplifier (PA) and a phase shifter may be coupled to each antenna transmitter. Accordingly, three types of active array antennas shown in FIGS. 8 to 10 may be considered.

A common TRX means a transmission and reception signal processing block. That is, in a passive array of FIG. 8, one RF transmission signal is branched into a plurality of antennas. Each antenna includes only a phase shifter without a PA. Accordingly, since phase shifting of the same RF signal is performed equally or differently according to antenna element, the same or individual phase shifting is possible.

An active antenna array has a structure in which phase shifters and PAs are coupled to antenna elements in 1:1 correspondence as shown in FIG. 9. Since a common transmission and reception signal processing block is used, the same RF signal is branched similarly to FIG. 8. The active antenna array is different from the passive array in that PAs corresponding in number to the number N of antenna elements are included.

A multiple active antenna array has a structure in which TRXs, phase shifters and PAs corresponding in number of to the number N of antenna elements are coupled. Accordingly, the multiple active antenna array has a more complex structure than those of the above-described antenna arrays but has highest flexibility for analog beam control.

The phase shifter used for the above-described antenna array systems will now be described.

The phase shift (phase shifter) refers to a device for shifting a signal phase using an electrical or mechanical method. The phase shifter used herein may be a fundamental module for driving the above-described massive antenna for beam control and phase shifting of the phase array antenna as shown in FIGS. 8 to 10. The method of shifting the phase at the phase shifter will now be described.

The phase shift is added to a final RF signal processor after a baseband signal subjected to digital signal processing is converted into an analog signal by a digital-to-analog (DAC) converter and the analog signal is processed. That is, in the phase shift, signal processing per frequency band is impossible. The phase shifting method of the phase shifter may include the following five methods.

1. Method of Mechanically Changing the Length of a Line.

In a structure in which two metal coaxial lines overlap, one coaxial pipe expands and contracts while being inserted into and taken out of the other coaxial line.

Merit: The phase may be consecutively changed. Low loss.

Demerit: It takes significant time to change the phase due to a mechanical method. Large size (including passive type and automatic motor type)

2. Phase Shift Method 1 of Electrically Changing the Length: Line Changing Method A plurality of transmission lines having different lengths is provided and the paths thereof are changed by a switch.

Merit: Small size. A phase shift time is very short.

Demerit: The phase value may not be consecutively changed (digital). Greater loss than in mechanical method.

E.g.,) 4-bit phase shifter of a line changing method: The phase may be changed from 0 to 337.5 in units of 22.5.

3. Phase Shift Method 2 of Electrically Changing the Length: Reflection Method

Similarly to the principle that light is reflected from some place such that the phase thereof is changed, an electrical signal is reflected from an impedance change point such that the phase thereof is changed.

Merit: The insertion phase may be adjusted according to a value of an element connected to a middle part of a transmission line.

Demerit: Insertion loss deteriorates and impedance characteristics also deteriorate.

4. Phase Shift Method 3 of Electrically Changing the Length: Loaded Line Type, Hybrid Coupled Type This is frequently used for a digital type phase shifter.

Loaded line type: This is used for a phase shifter having a phase shift amount of 45° or less.

Hybrid Coupled Type: This is used for a phase shifter having a phase shift amount of 45° or more.

The phase is changed using reactance change when a PIN diode is turned on/off.

5. Vector Modulator Phase Shifter

Method of obtaining a signal having a necessary phase by adjusting the levels of two orthogonal components according to desired phase and mixing the two orthogonal components at a mixer E.g.,) A=r∠0°(=r cos 0°+j r sin 0°)→[3 dB Amp]√2r∠0°→[3 dB 90° Hybrid]r∠0°, r∠90°
→[Variable Attenuator]r cos θ∠0°, r sin θ∠90°→[Combiner] r∠θ°

If the above-described antenna system is used, the below-described phase shifting errors may occur. In one aspect of the present invention, a method of compensating for phase shift errors which may occur in a phase shifter for analog beamforming when performing wideband transmission will be described. Phase shifting of the phase shifter may be generally performed in a narrow band without any problems. That is, phase shifting may be performed with respect to an analog signal of a band of 5 MHz or 10 MHz without any problems.

However, currently, basic bandwidth of high-frequency band transmission for designing a system based on a wideband frequency is several hundreds of MHz or several GHz. Thus, current design of the phase shifter is only valid within several. MHz or 10 MHz or less from the center frequency $f_c$. In this case, phase shift of an analog beam occurs according to the phase value set in the phase shifter with respect to the center frequency but the value thereof may be changed with respect to the frequency band other than the center frequency band.

Figure 11:
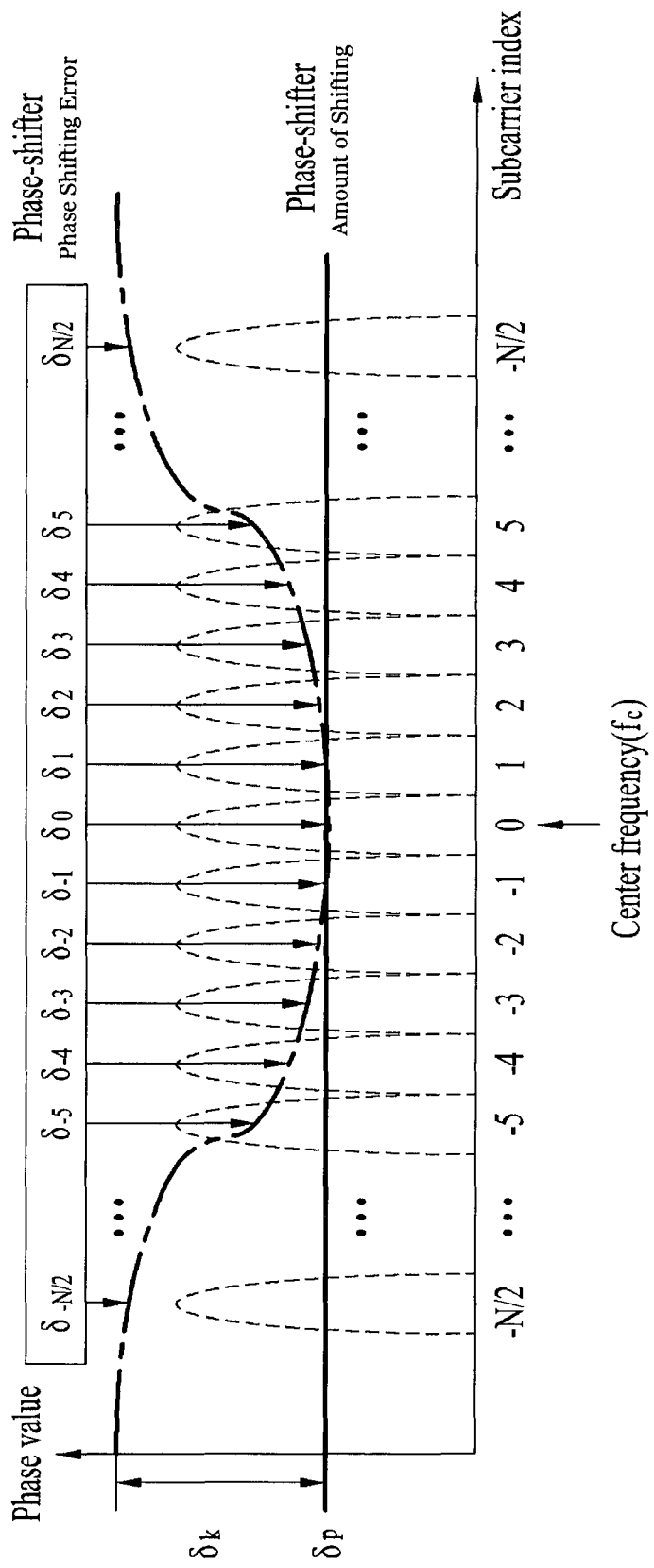
FIG. 11 is a diagram for explaining phase shifting error in a wideband transmission system.

FIG. 11 is a diagram for explaining phase shifting error in a wideband transmission system.

As shown in FIG. 11, the phase is shifted by $\delta_p$ in a valid range from the center of the whole frequency bandwidth but the phase value is gradually changed in the range other than the valid range. This may occur upon wideband transmission. Since phase shifting is performed through the phase shift after the baseband signal is converted into an analog signal, it is difficult to perform phase shifting only with respect to a specific band.

Figure 12:
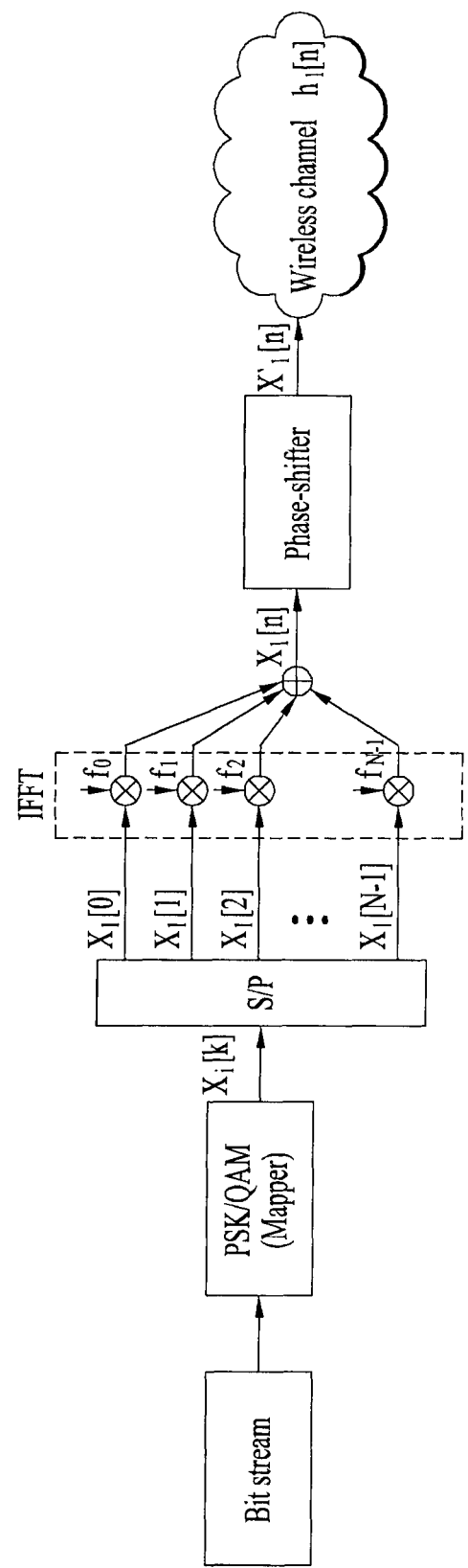
FIGS. 12 and 13 show a location of a phase shifter within OFDM transmission and reception block.
Figure 13:
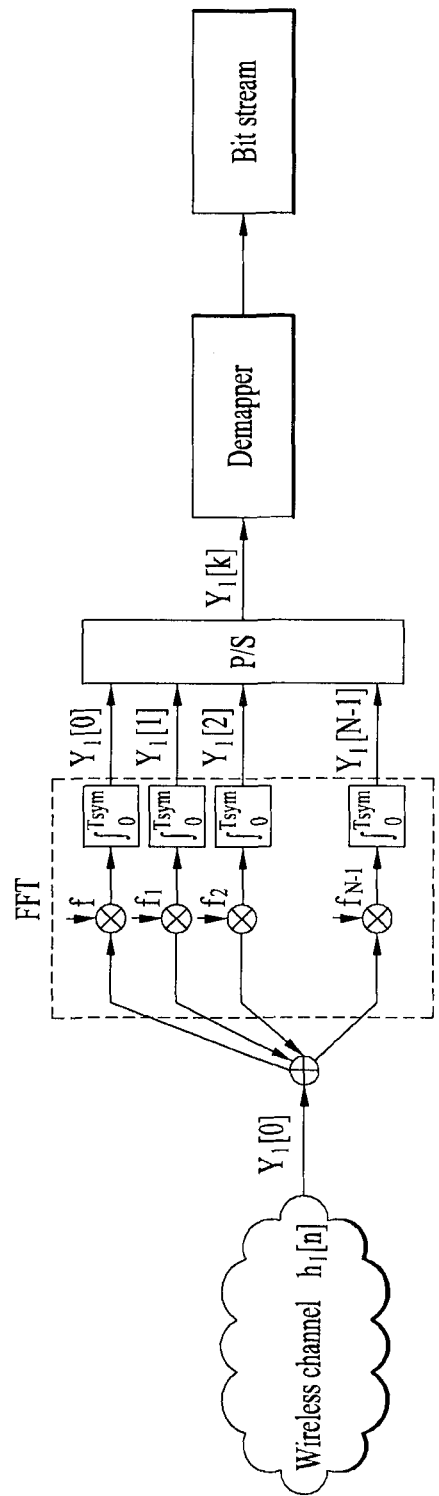

FIGS. 12 and 13 show a location of a phase shifter within an OFDM transmission and reception block.

As shown in FIG. 12, a phase shifter is located in an OFDM transmission block and phase shifting is performed via a phase shifter after a transmission symbol subjected to OFDM modulation is converted into an analog RF signal.

A discrete OFDM signal subjected to OFDM modulation may be expressed by Equation 1 below.

$$x_l[n] = \sum_{k=0}^{N-1} X_l[k]e^{j2\pi kn/N} \qquad \text{[Equation 1]}$$

$$n = 0, 1, 2, 3, \ldots, N-1$$

where, $x_l[n]$ denotes an $n^{th}$ sample (time domain) obtained by sampling an $l^{th}$ OFDM symbol and $X_l[k]$ denotes a data symbol (frequency domain) transmitted on a $k^{th}$ subcarrier of an $l^{th}$ OFDM symbol. In addition, l denotes an OFDM symbol index, k denotes a subcarrier index, n denotes a sample index of a discrete time domain, and N denotes FFT size, that is, the total number of subcarriers.

At this time, when the analog OFDM symbol passing through the phase shifter is expressed in discrete signal form, Equation 2 below is obtained.

$$x'_l[n] = \sum_{k=0}^{N-1} X_l[k]e^{j2\pi kn/N}e^{j2\pi(\delta_p+\delta_k)} \qquad \text{[Equation 2]}$$

$$= \sum_{k=0}^{N-1} X_l[k]e^{j2\pi(kn/N+\delta_p+\delta_k)}$$

$$n = 0, 1, 2, 3, \ldots, N-1$$

where, $x_l'[n]$ denotes an $n^{th}$ sample (time domain) obtained by sampling an $l^{th}$ OFDM symbol passing through the phase shifter, $y_l[n]$ denotes an $n^{th}$ sample (time domain) of an $l^{th}$ received OFDM symbol, and $Y_l[k]$ denotes a data symbol (frequency domain) on a $k^{th}$ subcarrier of an $l^{th}$ received OFDM symbol. In addition, $\delta_p$ denotes a phase shifting value of the phase shifter and $\delta_k$ denotes phase shifting error of the $k^{th}$ subcarrier of the phase shifter.

That is, in Equation 2, two variables are added: one is a phase shifting value $\delta_p$ set in the phase shifter and the other is phase shifting error $\delta_k$ caused by the phase shifter. Shifting error $\delta_k$ is present regardless of the phase shifting setting value $\delta_p$ and may differ between subcarriers. Thus, a subcarrier index 'k' is included in $\delta_k$.

The received signal before last OFDM demodulation of FIG. 13 may be expressed by a discrete signal shown in Equation 3 and is expressed by an OFDM demodulation symbol as shown in Equation 4 when the signal does not pass through the phase shifter.

$$y_l[n] = x_l[n] * h_l[n] + z_l[n] \qquad \text{[Equation 3]}$$

$$= \sum_{m=0}^{\infty} h_l[m]x_l[n-m] + z_l[n]$$

$$n = 0, 1, 2, 3, \ldots, N-1$$

$$Y_l[k] = H_l[k]X_l[k] + Z_l[k] \qquad \text{[Equation 4]}$$

where, $h_l[n]$, $z_l[n]$ denotes a wireless channel impulse function and AWGN noise and $H_l[k]$, $Z_l[k]$ denotes a frequency response and noise of a channel in a $k^{th}$ subcarrier.

However, the received signal is demodulated in the form of Equation 5 if the signal passes through the phase shifter.

$$Y_l[k] = H_l[k]X_l[k]e^{j2\pi(\delta_p+\delta_k)}+Z_l[k] \qquad \text{[Equation 5]}$$

That is, the phase shifting error $\delta_k$ and the phase shifting setting value $\delta_p$ of an angle of a received signal coexist per subcarrier.

In one embodiment for solving such a problem; pre-compensation precoding is performed in order to compensate for phase errors occurring upon phase shifting of the phase shifter.

Figure 14:
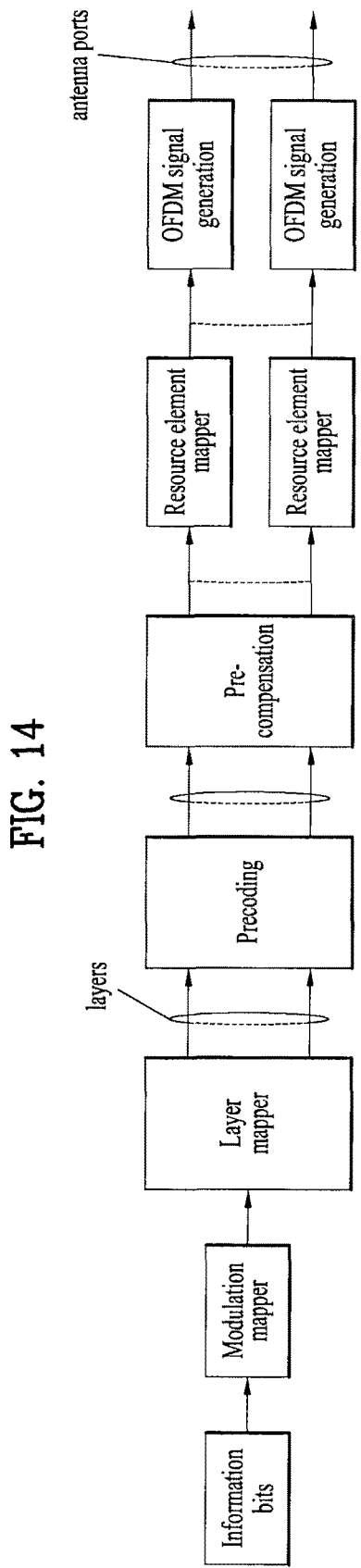
FIG. 14 shows an example of preferred embodiment for pre-compensating phase shifting errors.

FIG. 14 shows an example of preferred embodiment for pre-compensating phase shifting errors.

As shown in FIG. 14, in the present embodiment, error which may occur in wideband communication is corrected by adding a pre-compensation block before a signal is branched into antennas by a digital processing block to pass through an IFFT block. Accordingly, a signal, to which phase shifter phase compensation is applied in each subcarrier, may be expressed by Equation 6.

$$y = HF_{PS}Fx+z \qquad \text{[Equation 6]}$$

where, y denotes a received signal vector $N_r \times 1$ in a $k^{th}$ subcarrier, H denotes an $N_r \times N_t$ channel matrix in a $k^{th}$ subcarrier, $F_{PS}$ denotes an $N_t \times N_t$ phase shifter error compensation matrix (diagonal matrix) in a $k^{th}$ subcarrier, F denotes a general $N_t \times v$ precoding matrix for beamforming in a $k^{th}$ subcarrier, x denotes a transmitted signal vector $v \times 1$ in a $k^{th}$ subcarrier, and z denotes an AWGN noise vector $N_r \times 1$ in a $k^{th}$ subcarrier.

At this time, each vector and matrix may be expressed by Equation 7.

$$\begin{bmatrix} y^{(0)} \\ \vdots \\ y^{(Nr-1)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} \begin{bmatrix} e^{-j2\pi\delta_k} & 0 & \cdots & 0 \\ 0 & e^{-j2\pi\delta_k} & \cdots & 0 \\ \vdots & \vdots & \ddots & \vdots \\ 0 & 0 & \cdots & e^{-j2\pi\delta_k} \end{bmatrix} \qquad \text{[Equation 7]}$$

$$\begin{bmatrix} F_{11} & F_{12} & \cdots & F_{Nt,v} \\ F_{21} & F_{22} & \cdots & F_{Nt,v} \\ \vdots & \vdots & \ddots & \vdots \\ F_{Nt1} & F_{Nt2} & \cdots & F_{Nt,v} \end{bmatrix} \begin{bmatrix} x^{(0)} \\ \vdots \\ x^{(v-1)} \end{bmatrix} + \begin{bmatrix} z^{(0)} \\ \vdots \\ z^{(Nr-1)} \end{bmatrix}$$

That is, since the same phase errors occurring in each transmit antenna are corrected, a phase error compensation matrix of a phase shifter has a diagonal matrix, a value of which may differ between subcarriers. Such a phase error compensation matrix may be different from a conventional cyclic delay diversity (CDD) method in that different compensation values are provided according to subcarrier.

The analog signal branched into the antennas via such a method is subjected to analog beamforming with a phase shifting value of $\delta_p$ set in each system after passing through a phase shifter. Through such a method, the signal, the phase of which has already shifted before passing through the phase shifter, has $Y_l[k] = H_l[k]X_l[k]e^{j2\pi(\delta_p+\delta_k-\delta_k)}+Z_l[k]$ and thus only a phase shifting value $\delta_p$ set by the phase shifter remains.

Here, assume that errors occurring in the phase shifter are the same in all blocks regardless of the phase shifting setting value. Accordingly, this is applicable to all the above-described various antenna array systems.

In another aspect of the present invention, phase shifting is applied in subcarrier set having similar phase error of the pre-compensation block.

Although only the phase shifting value $\delta_p$ intended by the phase shifter should be changed according to subcarrier, when the signal passes through the phase shifter, constant phase error $\delta_k$, which varies according to frequency band or $k^{th}$ subcarrier, may occur regardless of the phase shifting value $\delta_p$. As described above, if transmission bandwidth is several MHz or less, it may be assumed that the same phase error occur in the whole frequency band or subcarriers and thus a relationship shown in Equation 8 below may be satisfied.

$$\delta_k \to \delta_0 = \delta_1 = \delta_2 \ldots = \delta_{N-1} \quad \text{[Equation 8]}$$

However, if the bandwidth is several hundreds of MHz or several GHz, these values may not be approximated to one value. Therefore, it may be assumed that the same phase error occurs in a predetermined band or a set including a predetermined number "S" of subcarriers. Accordingly, in the present embodiment, it may be assumed that a relationship shown in Equation 9 below is satisfied.

$$\delta_k \to \begin{cases} \delta_0 = \delta_1 = \delta_2 \ldots = \delta_{S-1} & \text{[Equation 9]} \\ \delta_S = \delta_{S+1} = \delta_{S+2} \ldots = \delta_{2S-1} \\ \delta_{2S} = \delta_{2S+1} = \delta_{2S+2} \ldots = \delta_{3S-1} \\ \vdots \\ \delta_{N-S} = \delta_{N-S+1} = \delta_{N-S+2} \ldots = \delta_{N-1} \end{cases}$$

In the above-described embodiment, the size of the subcarrier set may be predetermined and may be changed according to system state.

Figure 15:
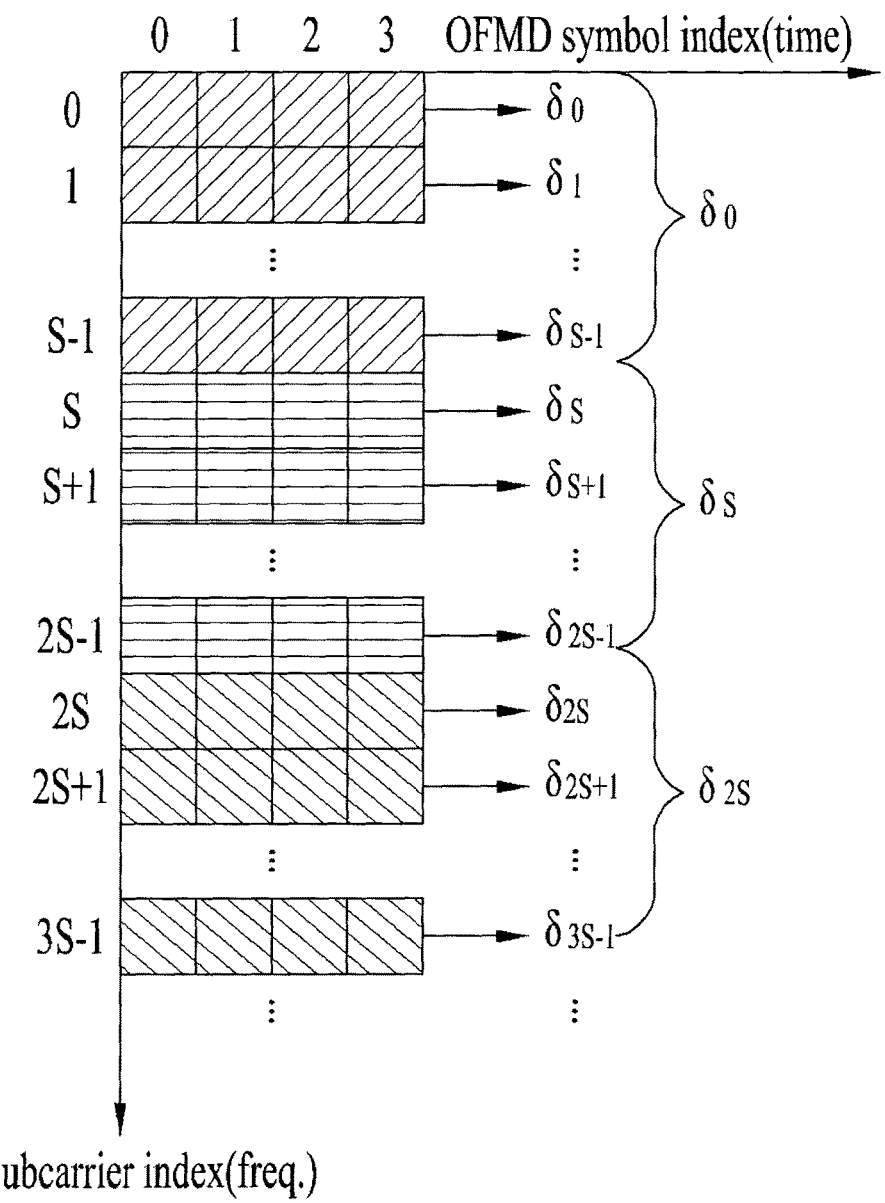
FIG. 15 shows an example of applying one preferred embodiment of the present invention.

FIG. 15 shows an example of applying one preferred embodiment of the present invention.

In FIG. 15, a horizontal axis denotes a time axis of an OFDM symbol unit and a vertical axis denotes a frequency axis of a subcarrier unit. In addition, the subcarriers of the vertical axis may be shown in units of subcarrier sets each having a size S. As shown in FIG. 15, if the same phase correction value $-\delta_k$ is applied per subcarrier set, operation may be simplified as compared to the case of applying the phase correction value per subcarrier.

Meanwhile, hereinafter, a method of acquiring phase shifting error information will be described.

In one embodiment of the present invention, phase errors of the phase shifter are estimated via comparison between transmitted signals in a base station. For phase compensation of the phase shifter, phase error caused by the phase shifter should be estimated. Here, an entity for performing analog beamforming using a massive array antenna directly performs channel estimation. That is, when the base station performs analog beamforming using the massive antenna, a per-band phase difference between signals passing through the phase shifter may be directly compared.

Meanwhile, in another embodiment of the present invention, a method of, at a UE, which has received a pure pilot pattern, estimating phase error of a phase shifter, and feeding the phase error back to a base station is proposed. This method uses a general pilot based channel estimation method which may be set with respect to all UEs. That is, a conventional pilot channel estimation method may be reused. This method is characterized in that all UEs may feed phase errors back per subband with respect to the whole frequency band. This is because phase shifting errors caused by the phase shifter differ between subcarriers or subcarrier sets.

First, the UE performs pure channel estimation in a state in which the phase shift does not operate. At this time, assume that a wireless channel is estimated per subcarrier using a least-squares method shown in Equation 10.

$$\hat{H}_l[k] = \frac{Y_l[k]}{X_l[k]} \quad \text{[Equation 10]}$$

where, $X_l[k]$ denotes a signal via which a pilot signal is transmitted.

Thereafter, a wireless channel shown in Equation 11 may be estimated using the signal through the phase shifter in the same manner.

$$\hat{H_{l,ps}}[k] = \frac{Y_l[k]}{X_l[k]} \quad \text{[Equation 11]}$$

At this time, if Equation 11 is divided by Equation 10, per-subcarrier phase error may shown in Equation 12 below is obtained.

$$e^{j2\pi\delta_k} = \hat{H}_{l,ps}/\hat{H}_l \quad \text{[Equation 12]}$$

When the UE feeds such a result back to the base station, a soft value may be transmitted without change and the result may be fed back using a quantization method. For example, a section $[0, 2\pi]$ may be quantized into N bits to have $2^N$ resolutions.

The base station uses the phase error value fed back by each UE or may use an average of the values fed back by all UEs.

Meanwhile, in another embodiment of the present invention, a method of simultaneously setting pilot signals in the whole frequency band and estimating phase error is proposed.

Figure 16:
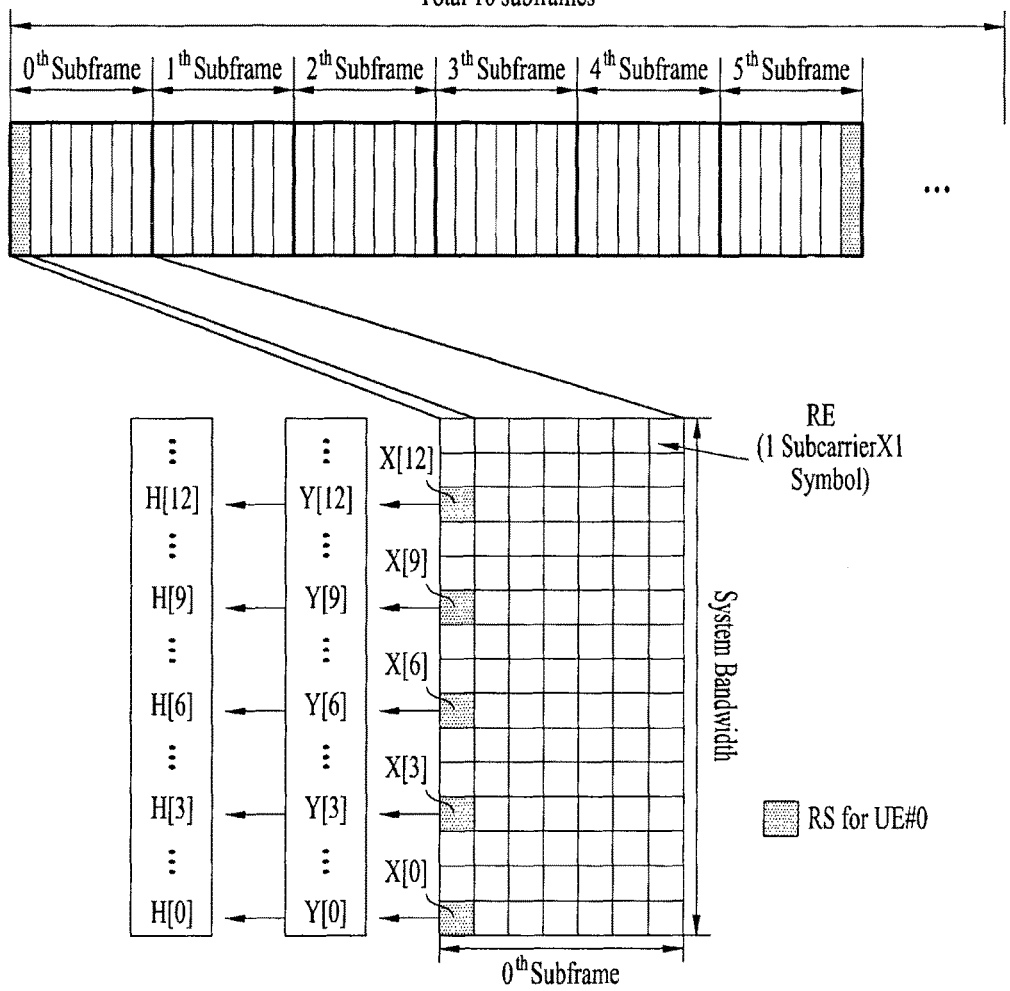
FIG. 16 shows an example of using pilot pattern in the whole system bandwidth.

FIG. 16 shows an example of using pilot pattern in the whole system bandwidth.

As described above, the phase shifter simultaneously changes the whole phase of the analog RF signal. Accordingly, the digital processing block should compensate for the phase error of the whole bandwidth. Accordingly, each UE may derive phase error caused by the phase shifter based on channel estimation for the whole system bandwidth, not based on bandwidth allocated thereto.

At this time, the base station may allocate a pilot signal to the whole transmission bandwidth and perform estimation. For example, in the whole bandwidth, as shown in FIG. 16, a pilot pattern for the whole bandwidth may be defined and the UE may perform interpolation between the detected pilot signals and estimate phase shifting errors for all channels.

Meanwhile, in another embodiment of the present invention, a method of setting a pilot signal according to subband with a predetermined period and estimating phase error.

Figure 17:
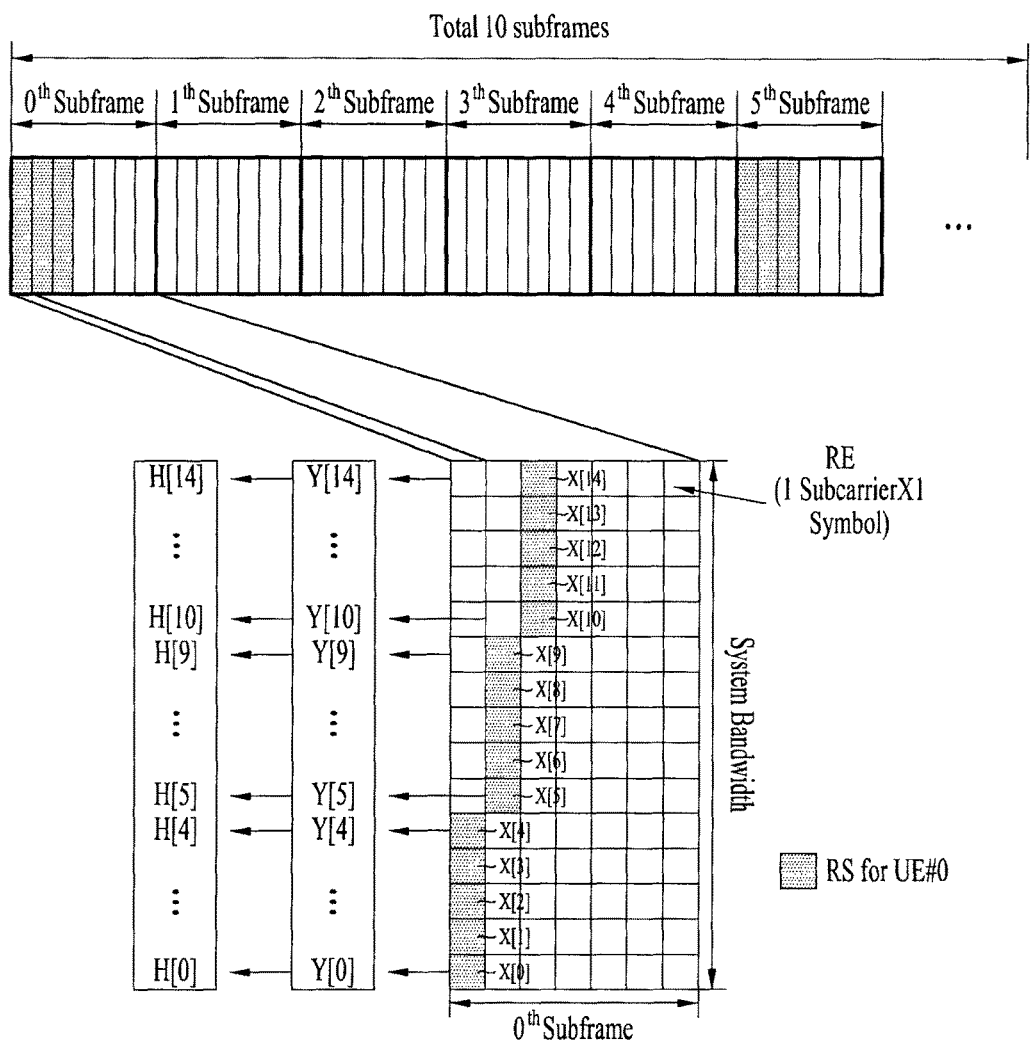
FIG. 17 shows an example of estimating phase shifting error using pilot pattern defined in a particular subband.

FIG. 17 shows an example of estimating phase shifting error using pilot pattern defined in a particular subband.

Unlike the above-described embodiments, each UE may derive phase error caused by the phase shifter based on channel estimation for the subband allocated thereto. At this time, the base station defines a pilot allocation pattern such that channel estimation for the whole bandwidth is possible or channel estimation for the whole bandwidth is possible over several symbols. For example, as shown in FIG. 17, different patterns are defined per subband and channel and phase shifting error for the whole bandwidth may be estimated over three OFDM symbols. Even at this time, interpolation between pilot signals may be performed and phase shifting error for all channels may be estimated.

As described above, the present invention proposes a method of performing pre-compensation for phase shifting error by precoding. More specifically, in a preferred embodiment of the present invention, a compensation method considering characteristics of a phase shifter upon analog beamforming at a transmitter including a 2-dimensional antenna array including a plurality of antennas is proposed.

Hereinafter, the configuration of an apparatus for implementing the above-described methods will be described.

Figure 18:
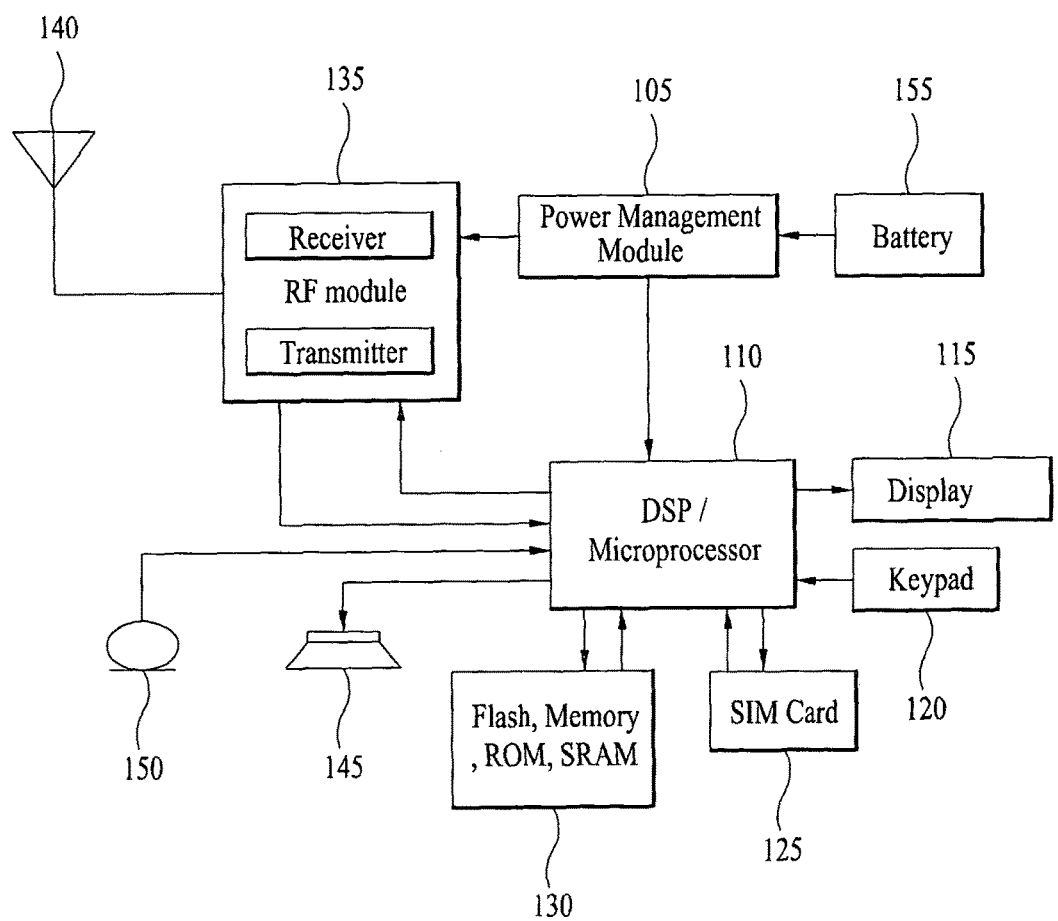
FIG. 18 is a block diagram of a communication apparatus according to an embodiment of the present invention.

FIG. 18 is a block diagram of a communication apparatus according to an embodiment of the present invention.

The apparatus shown in FIG. 18 can be a a user equipment (UE) and/or eNB adapted to perform the above mechanism, but it can be any apparatus for performing the same operation.

As shown in FIG. 18, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for transmitting signals in a mobile communication system using multiple antennas, the method comprising:
   precoding a digital signal;
   receiving information on phase errors per subcarrier set with respect to a whole frequency band equal to or larger than several hundreds of megahertz (MHz);
   performing a phase compensation on the digital signal based on the received information,
   wherein the phase compensation compensates different amounts of phase for each subcarrier set, and
   wherein the amount of phase errors for each subcarrier set is larger as a distance between a center frequency of the whole frequency band and a center frequency of each subcarrier set is larger;
   converting the phase compensated-digital signal to an analogue signal;
   performing analogue beamforming by phase shifting the analogue signal, using a phase shifting setting value, with respect to the whole frequency band; and
   transmitting the phase shifted analogue signal to a receiver,
   wherein the amount of phase errors for a specific subcarrier set is identical regardless of a value of the phase shifting setting value.

2. The method of claim 1, wherein the information on phase errors per subcarrier set comprises an amount of phase error per subcarrier set.

3. The method of claim 1, wherein converting the phase compensated-digital signal to the analogue signal comprises:
   performing an Inverse Fast Fourier Transform (IFFT) to the phase compensated-digital signal.

4. The method of claim 1, wherein the amount of the phase error for a subcarrier set including the center frequency is 0.

5. A device operating in a wireless communication system, the device comprising:
   a transceiver for transmitting and receiving signals to and from another device; and
   a processor connected to the transceiver and configured to a digital signal to be transmitted,
   wherein the processor receives information about phase errors per subcarrier set with respect to a whole frequency band equal to or larger than several hundreds of megahertz (MHz),
   wherein the processor performs a phase compensation on the digital signal based on the received information,
   wherein the phase compensation compensates different amounts of phase for each subcarrier set,
   wherein the amount of phase errors for each subcarrier set is larger as a distance between a center frequency of the whole frequency band and a center frequency of each subcarrier set is larger,
   wherein the processor converts the phase compensated-digital signal to an analogue signal,
   wherein the processor performs analogue beamforming by phase shifting the analogue signal, using a phase shifting setting value, with respect to the whole frequency band,
   wherein the processor controls the transceiver to transmit the phase shifted analogue signal to the another device, and
   wherein the amount of phase errors for a specific subcarrier set is identical regardless of a value of the phase shifting setting value.

6. The device of claim 5, wherein the information on phase errors per subcarrier set comprises an amount of phase error per subcarrier set.

7. The device of claim 5, wherein the processor performs an Inverse Fast Fourier Transform (IFFT) to the phase compensated-digital signal for converting the phase compensated-digital signal to the analogue signal.

8. The device of claim 5, wherein the amount of the phase error for a subcarrier set including the center frequency is 0.

* * * * *